Sept. 20, 1966   J. H. ANDERSON ET AL   3,273,920
COMBINATION SHAFT AND HUB ASSEMBLY FOR CENTRIFUGAL COMPRESSOR
Filed April 8, 1963   2 Sheets-Sheet 1

INVENTORS
JAMES H. ANDERSON &
BY MARINUS J. SPRUITENBURG

ATTORNEY

United States Patent Office 3,273,920
Patented Sept. 20, 1966

3,273,920
COMBINATION SHAFT AND HUB ASSEMBLY FOR CENTRIFUGAL COMPRESSOR
James H. Anderson, Spring Garden Township, and Marinus J. Spruitenburg, York, Pa., assignors to Borg-Warner Corporation, Chicago, Ill., a corporation of Illinois
Filed Apr. 8, 1963, Ser. No. 271,200
2 Claims. (Cl. 287—52)

This invention relates to a combination shaft and hub assembly, and more particularly to such an assembly incorporated in a centrifugal compressor.

Because of the relatively high rotational speeds encountered in impeller type compressors, one of the major difficulties in constructing such compressors has been the requirement that the tolerances of the various components, particularly of the gear train commonly employed between whatever prime mover is used and the impeller, be small. Otherwise, the resulting misalignment of components and unequal distribution of torque loads results in an early breakdown either partially or fully of the device. As is well known, the requirements that tolerances be kept quite small is extremely expensive from a practical viewpoint during the manufacturing process; and consequently, the cost to the user is much greater. Furthermore, aside from initial costs, the requirement that tolerances be held quite small limits the useful application of compressors since use in environments subject to wide ranges in temperature variation and wide ranges of external loads which might accidentally be placed on the device is precluded.

Accordingly, it is an object of the present invention to provide a gear arrangement between the input and output shafts of an impeller type compressor which does not require tolerances of extremely small orders of magnitude.

It is a further object of the invention to provide a gear train between power input and output shafts susceptible of precise alignment upon assembly thereby to compensate for any inherent misalignment of the components thereof.

It is a further object of this invention to provide a novel means for accurately centering a gear upon a shaft thereby to preclude any eccentricity of the gear with respect to another torque transmitting hub member mounted on the shaft.

Additional objects and advantages will be apparent from reading the following detailed description with reference to the drawings wherein.

Figure 1:
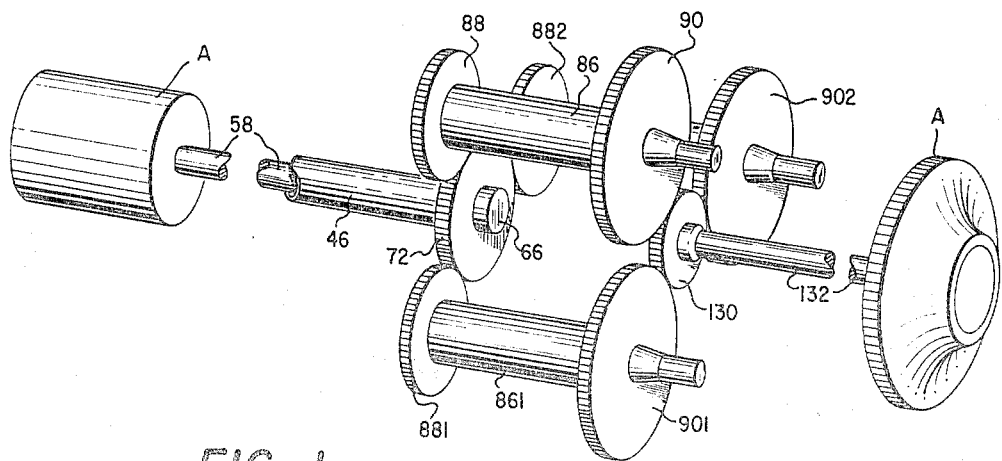
FIGURE 1 is a partially schematic, perspective illustration of a gear train for a compressor constructed in accordance with the principles of the present invention.

Referring first to FIGURE 1, a gear train for a compressor drive assembly is illustrated in schematic form. The gear train is arranged so that the shaft 58 is driven by a prime mover A, such as an electric motor or the like, said shaft being journalled in suitable means (not shown), such as bearings supported in a housing. The output shaft 132 is connected to the impeller B of a centrifugal compressor in a manner understood by those skilled in the art. A sleeve 46 carries and surrounds the elongated, flexible, input shaft 58 which receives the power from the prime mover; and another sleeve 66 is fitted over one end of sleeve 46 to support a gear 72 thereon.

The numeral 90 denotes a gear mounted on axle 86, the gear having a plurality of angularly spaced bolts 92 threaded through the hub portion 94 thereof, through complementary angularly spaced openings 96 passing through a flange 98 integral with axle 86 and through an annular ring 100. The diameter of openings 96 is appreciably greater than the diameter of bolts 92, for a reason which will be set forth more fully hereinafter.

The numeral 130 denotes a gear whose teeth mesh with the teeth of gear 90. It is to be noted that there are three gears 90 angularly spaced, each meshing with gear 130. The interior of the aperture through the hub portion of gear 130 is threaded and mates with threads on the left end of a shaft 132. Shaft 132, as shaft 58, is preferably formed of steel and its main or central portion is of lesser diameter than its extreme end portions to thereby impart the desired flexibility thereto.

The purpose of the train in an impeller type compressor is to increase the angular velocity of the shaft 132 so that the impeller 160 may rotate at a velocity great enough to yield the desired compression of the gases. The gear train consists of the three angularly spaced axles or countershafts 86, 861 and 862 respectively associated with gears 88, 881 and 882 which are in mesh with gear 72. Since gear 72 is of lesser diameter there is an increase in angular velocity between shaft 58 and countershafts 86, 861 and 862. Moreover, since the diameters of gears 90, 901 and 902 are greater in diameter than gear 130, there is a further increase in angular velocity between the axles 86, 861 and 862 and output shaft 132. It will be observed that gears 72 and 130 define the sole-support for the ends of shafts 58 and 132 respectively. The gears in turn are supported by the planetary or outer gears. This arrangement permits input and output gears 72 and 130 to float in the center of a circle passing through the centerlines of the three external axles 86, 861 and 862, whereas fixed bearings for the inner ends of shafts 58 and 132 would only do this if the bearing locations were perfect.

With the relatively high angular velocities demanded of present day impeller type compressors, the problem of proper alignment of the compressor components, such as the elements of the gear train, due to manufacturing tolerances becomes increasingly significant. Considering the gear train illustrated at FIGURE 1 of the drawings, it will be seen that if gears 90, 901 and 902 are not concentric with gears 88, 881 and 882, respectively, the resulting eccentricity will result in an alternate motion of gears 90, 901 and 902 towards and away from gear 130 accompanied by similar motions of gears 88, 881 and 882 with respect to gear 72. These resulting motions would create problems of vibration and wear and are particularly undesirable in apparatus adapted for relatively high speed operation.

Figure 2:
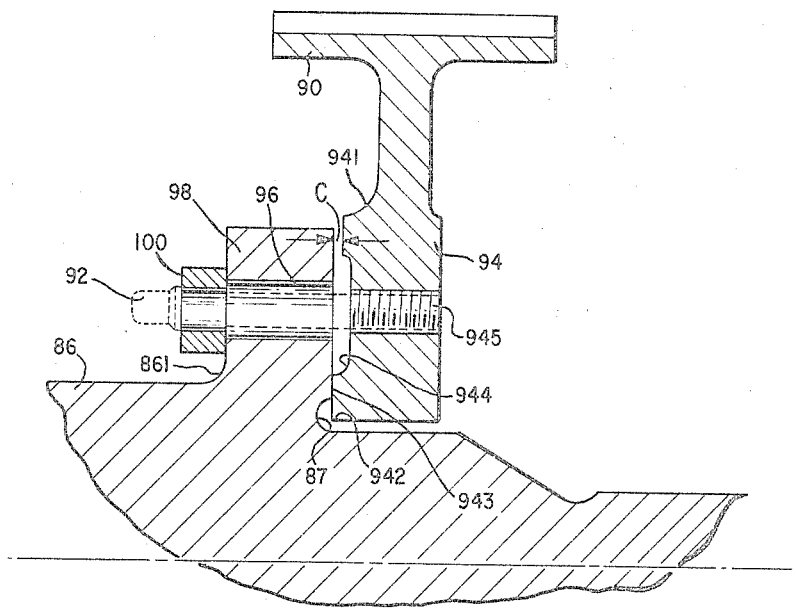
FIGURE 2 is a cross-section view, before final assembly, of the shaft and hub assembly forming a part of the gear train illustrated in FIGURE 1.

In order to preclude any eccentricity of gear 90 with respect to gear 88 (the description being the same for the other counterparts of these elements), gear 90 is provided at its hub or web portion 94 with a plurality of angularly spaced apertures 945 each of which receives one of the bolts 92. Preferably, there are at least three such apertures 945 equally spaced both angularly and radially from the center line of aperture 91 which receives axle 86. The hub portion 94 is provided with a peripheral abutment surface 943 adjacent the aperture 91, adapted to abut the lower portion or radially innermost portion of the right hand face of flange 98. A peripheral stress concentration relieving groove 87 is provided between the right face of flange 98 and the shaft 86. A continuous groove 944 is provided in hub portion 94. Surface 941 on the left face of hub portion 94 is, before assembly, spaced from the right face of flange 98, as denoted by C of FIGURE 2.

To effect assembly, bolts 92 are placed in their corresponding apertures in friction ring 100 and extend through openings 96 of flange 98 and into apertures 945 of hub portion 94. Preferably, the bolts 92 assume the form of threaded bolts with the ends thereof threadedly engaging apertures 945. Upon tightening the fasteners, the ring 100 is urged progressively firmer against the left face of flange 98, portions 941 and 942 rotate in a counterclockwise direction about an axis perpendicular to the plane of FIGURE 3 and within aperture 945. Corner 942 binds or digs into the surface of axle 86, as the clearance C diminishes to zero. This action taking place at angularly spaced portions of gear 90, the gear is thus centered with respect to shaft 86.

Referring again to FIGURES 1 and 2 of the drawings, the input torque is transferred from shaft 58, through the gear train and thence to shaft 132. The plurality of axles 86 (861 and 862) are preferably equidistant angularly spaced with respect to the common center line of shafts 58 and 132. It is preferable that each axle 86 (861 and 862) take its share of the load and towards this end it is necessary that the mesh between the set of gears 88, 881 and 882 and gear 72 be such that each meshes with gear 72 so that upon the latter's rotation, each will advance an equal amount angularly. Further, it is also necessary that the mesh between gears 90, 901 and 902 and gear 130 be such that each contribute torque equally to gear 130. Should the above conditions fail to obtain due to improper meshing of the teeth of the various gears as would be the case if gears 88 and 90, or their counterparts, were not in the intended angular relation due to manufacturing tolerances, or did not have multiples of three teeth, some gears would carry more and some less than their designed or intended amounts leading to maintenance problems, vibration and even eventual breakdown. Consequently, the gears must be accurately located in proper meshing relation to insure the equal distribution of torque loads. To this end, the openings 96 in flanges 98 are made appreciably larger than the bolts 92 passing therethrough. In assembling the gear onto the shaft the freedom afforded by the larger opening in the flange permits the gear to be precisely positioned in proper meshing relationship. It has been found that the span of the openings 96, that is the angular distance between the opposite ends of the opening as measured circumferentially, should be at least as large as ⅔ of the circular pitch of the gear teeth on the gear connected to the flange.

Upon assembly of the compressor, gears 90, 901 and 902 and gear 130 are positioned, the bolts 92 exerting only a slight binding force to maintain the gears 90 on axles 86.

Figure 3:
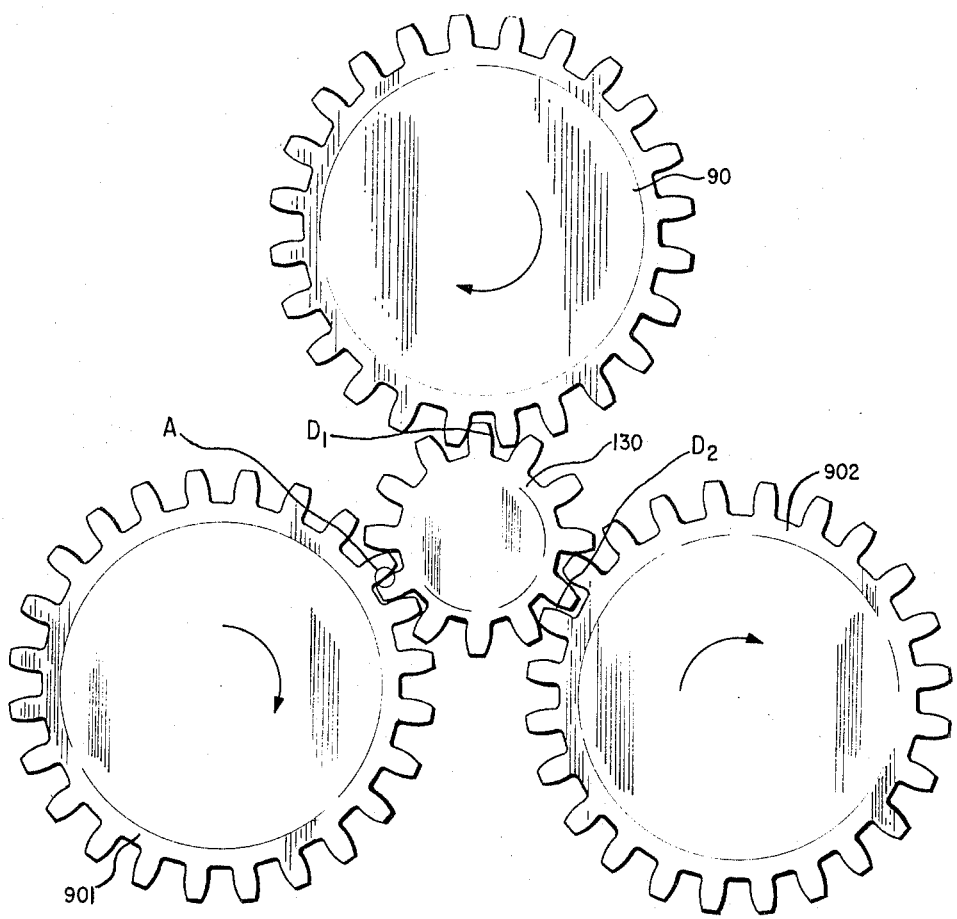
FIGURE 3 is a partially schematic end view of certain of the gears of the gear train.

To assemble the gear train, shafts 58 and 132 are temporarily aligned; then output shaft 132 is held fixed and input shaft 58 is turned slightly until the three gears 88, 881 and 882 rotate with rotation of gear 72. With the gears 90, 901 and 902 and gear 130 in place, but with the bolts 92 not tight, a relationship between these gears is illustrated at FIGURE 3 of the drawings. For purposes of illustration and explanation, gear 901 is shown as initially in complete and full driving engagement with gear 130 at area A. There is, however, no mesh between gear 90 and gear 130 and gear 902 and gear 130. This lack of meshing might be caused by a number of variables such as manufacturing tolerances. In any event, the lack of complete mesh is indicated, respectively, by $D_1$ and $D_2$, shown greatly exaggerated for purposes of illustration. Gear 72 is now turned slightly causing axles 86, 861 and 862 to turn. Gear 130 being held fixed, gear 901 will slip relative to axle 861, contact at A being maintained. Gears 90 and 902 will rotate in the indicated directions until clearances $D_1$ and $D_2$ vanish. At this stage of assembly, gear 90 is fixed with respect to its axle 86 for proper transmission of its equal share of the load to the gear 130, similarly gears 901 and 902 are also properly angularly spaced with respect to their axles for contributing their equal share of the load to gear 130. Gear 130 is now withdrawn from the position shown in FIGURE 1, together with shaft 132 to yield access to the plurality of bolts 92 on the three gears 90, 901 and 902. These fastening elements are now tightened to maintain their angular positions with respect to their axles upon which they are mounted and the gear 130 and shaft 132 are now replaced, this time without the temporary aligning ball bearings B.

The above aligning operation occurs at the place of assembly, usually the places of manufacture, of the compressor. In the event that disassembly is required after it has been placed in use, the same procedure is employed again to insure proper angular relationships of gears 90, 901 and 902 with respect to the axles upon which they are mounted.

While this invention has been described in connection with a certain specific embodiment thereof, it is to be understood that this is by way of illustration and not by way of limitation; and the scope of the appended claims should be construed as broadly as the prior art will permit.

We claim:

1. A combination shaft and hub assembly comprising a shaft having a radially extending flange; an annular hub having a central, circular opening, said hub being positioned on said shaft so that a portion of said shaft extends through said opening; means defining a first abutment surface on said hub in abutting engagement with a portion of said flange, means defining a second abutment surface on said hub spaced radially inwardly from said first abutment surface; said second abutment surface abutting a second portion of said flange and being axially spaced from said first abutment surface so as to engage said second portion of said flange prior to the engagement of said first abutment surface and said flange; a plurality of circumferentially spaced, threaded fasteners securing said hub to said flange and cooperating therewith so as to hold the hub and the flange in tight engagement, said hub being deformed in the vicinity of said second abutment surface when said hub is secured by said fastening elements, the diameter of said hub opening being initially greater than the diameter of said portion of the shaft extending therethrough, but being reduced in final assembly and thereby binding upon said shaft when the engagement of said second abutment surface with said flange is effective to deform the radially inner portion of said hub.

2. The assembly of claim 1 wherein said hub is of reduced thickness between said first and second hub abutment portions and wherein said flange is integral with said shaft and wherein the juncture of said flange with said shaft is provided with a groove of rounded cross-section to reduce the stress concentration of said junction upon assembly of the hub upon the shaft.

References Cited by the Examiner

UNITED STATES PATENTS 1,551,565  9/1925  Hodgkinson _____ 74—410
1,578,983  3/1926  Gossett _____ 74—395 X (Other references on following page)

UNITED STATES PATENTS

| | | | |
|---|---|---|---|
| 1,634,376 | 7/1927 | Miller | 74—410 |
| 2,237,958 | 4/1941 | Hansen et al. | 74—606 |
| 2,276,561 | 3/1942 | Bloss | 74—606 |
| 2,318,051 | 5/1943 | Brace | 287—53 |
| 2,362,514 | 11/1944 | Warner | 230—127 |
| 2,386,367 | 10/1945 | Taylor | 74—410 |
| 2,393,098 | 1/1946 | Freeman. | |
| 2,409,050 | 10/1946 | Ledwinka | 74—395 |
| 2,496,857 | 2/1950 | Cronstedt | 74—410 X |
| 2,516,077 | 7/1950 | Schmitter | 74—410 |
| 2,836,448 | 5/1958 | King | 287—53 |
| 2,845,696 | 8/1958 | Bourgues. | |
| 2,898,031 | 8/1959 | Voigt | 230—127 |
| 2,920,497 | 1/1960 | Wiken | 74—410 |
| 2,975,864 | 3/1961 | Stoffert. | |
| 3,065,822 | 11/1962 | McAfee. | |

DAVID J. WILLIAMOWSKY, *Primary Examiner.*

JOSEPH H. BRANSON, LAWRENCE V. EFNER, DON A. WAITE, *Examiners.*

H. F. RADUAZO, J. A. WONG, *Assistant Examiners.*